(12) United States Patent
Boddhu et al.

(10) Patent No.: US 9,177,254 B2
(45) Date of Patent: Nov. 3, 2015

(54) EVENT DETECTION THROUGH TEXT ANALYSIS USING TRAINED EVENT TEMPLATE MODELS

(71) Applicant: QBASE, LLC, Reston, VA (US)

(72) Inventors: Sanjay Boddhu, Dayton, OH (US); Robert Flagg, Portland, ME (US); Rakesh Dave, Dayton, OH (US); Scott Lightner, Leesburg, VA (US)

(73) Assignee: QBASE, LLC, Reston, VA (US)

( * ) Notice: Subject to any disclaimer, the term of this patent is extended or adjusted under 35 U.S.C. 154(b) by 0 days.

(21) Appl. No.: 14/558,300

(22) Filed: Dec. 2, 2014

(65) Prior Publication Data

US 2015/0154263 A1   Jun. 4, 2015

Related U.S. Application Data

(60) Provisional application No. 61/910,809, filed on Dec. 2, 2013.

(51) Int. Cl.
| | | |
|---|---|---|
| *G06F 17/00* | (2006.01) | |
| *G06N 5/02* | (2006.01) | |
| *G06N 5/04* | (2006.01) | |
| *G06F 17/30* | (2006.01) | |
| *G06N 7/00* | (2006.01) | |
| *H04L 29/08* | (2006.01) | |
| *G06N 99/00* | (2010.01) | |

(52) U.S. Cl.
CPC ............ *G06N 5/04* (2013.01); *G06F 17/30539* (2013.01); *G06F 17/30598* (2013.01); *G06N 7/005* (2013.01); *G06N 99/005* (2013.01); *H04L 67/10* (2013.01)

(58) Field of Classification Search
None
See application file for complete search history.

(56) References Cited

U.S. PATENT DOCUMENTS

| | | |
|---|---|---|
| 6,128,660 A | 10/2000 | Grimm et al. |
| 6,178,529 B1 | 1/2001 | Short et al. |
| 6,266,781 B1 | 7/2001 | Chung et al. |
| 6,353,926 B1 | 3/2002 | Parthesarathy et al. |
| 6,738,759 B1 | 5/2004 | Wheeler et al. |
| 6,832,737 B2 | 12/2004 | Karlsson et al. |
| 7,058,846 B1 | 6/2006 | Kelkar et al. |

(Continued)

FOREIGN PATENT DOCUMENTS

WO    2013/003770 A2    1/2013

OTHER PUBLICATIONS

International Search Report and Written Opinion dated Mar. 3, 2015 corresponding to International Patent Application No. PCT/US2014/067921, 10 pages.

(Continued)

*Primary Examiner* — Kakali Chaki
*Assistant Examiner* — Luis Sitiriche
(74) *Attorney, Agent, or Firm* — Eric L. Sophir; Dentons US LLP

(57) ABSTRACT

A system and method for detecting events based on input data from a plurality of sources. The system may receive input from a plurality of sources containing information about possible events. A method for event detection involves pre-processing and normalizing a data input from a plurality of sources, extracting and disambiguating events and entities, associate event and entities, correlate events and entities associated from a data input to results from a different data sources to determine if an event has occurred, and store the detected events in a data storage.

14 Claims, 5 Drawing Sheets

(56) References Cited

U.S. PATENT DOCUMENTS

| | | | |
|---|---|---|---|
| 7,370,323 B2 | 5/2008 | Marinelli et al. | |
| 7,421,478 B1 | 9/2008 | Muchow | |
| 7,447,940 B2 | 11/2008 | Peddada | |
| 7,543,174 B1 | 6/2009 | van Rietschote et al. | |
| 7,681,075 B2 | 3/2010 | Havemose et al. | |
| 7,818,615 B2 | 10/2010 | Krajewski et al. | |
| 7,899,871 B1 | 3/2011 | Kumar et al. | |
| 8,055,933 B2 | 11/2011 | Jaehde et al. | |
| 8,122,026 B1 * | 2/2012 | Laroco et al. | 707/737 |
| 8,341,622 B1 | 12/2012 | Eatough | |
| 8,345,998 B2 | 1/2013 | Malik et al. | |
| 8,356,036 B2 * | 1/2013 | Bechtel et al. | 707/748 |
| 8,375,073 B1 * | 2/2013 | Jain | 707/899 |
| 8,423,522 B2 | 4/2013 | Lang et al. | |
| 8,429,256 B2 | 4/2013 | Vidal et al. | |
| 8,726,267 B2 | 5/2014 | Li et al. | |
| 8,782,018 B2 | 7/2014 | Shim et al. | |
| 8,995,717 B2 * | 3/2015 | Cheng et al. | 382/103 |
| 9,009,153 B2 * | 4/2015 | Khan et al. | 707/734 |
| 2001/0037398 A1 | 11/2001 | Chao et al. | |
| 2002/0165847 A1 | 11/2002 | McCartney et al. | |
| 2003/0028869 A1 | 2/2003 | Drake et al. | |
| 2003/0112792 A1 | 6/2003 | Cranor et al. | |
| 2003/0158839 A1 | 8/2003 | Faybishenko et al. | |
| 2003/0182282 A1 | 9/2003 | Ripley | |
| 2004/0027349 A1 * | 2/2004 | Landau et al. | 345/440 |
| 2004/0143571 A1 | 7/2004 | Bjornson et al. | |
| 2004/0153869 A1 | 8/2004 | Marinelli et al. | |
| 2004/0205064 A1 | 10/2004 | Zhou et al. | |
| 2004/0215755 A1 | 10/2004 | O'Neill | |
| 2005/0192994 A1 | 9/2005 | Caldwell et al. | |
| 2006/0101081 A1 | 5/2006 | Lin et al. | |
| 2006/0294071 A1 | 12/2006 | Weare et al. | |
| 2007/0005639 A1 | 1/2007 | Gaussier et al. | |
| 2007/0203693 A1 * | 8/2007 | Estes | 704/9 |
| 2007/0203924 A1 | 8/2007 | Guha et al. | |
| 2007/0240152 A1 | 10/2007 | Li et al. | |
| 2007/0250519 A1 | 10/2007 | Fineberg et al. | |
| 2007/0282959 A1 | 12/2007 | Stern | |
| 2008/0010683 A1 | 1/2008 | Baddour et al. | |
| 2008/0027920 A1 | 1/2008 | Schipunov et al. | |
| 2009/0019013 A1 * | 1/2009 | Tareen et al. | 707/3 |
| 2009/0043792 A1 | 2/2009 | Barsness et al. | |
| 2009/0049038 A1 | 2/2009 | Gross | |
| 2009/0089626 A1 | 4/2009 | Gotch et al. | |
| 2009/0094484 A1 | 4/2009 | Son et al. | |
| 2009/0240682 A1 | 9/2009 | Balmin et al. | |
| 2009/0292660 A1 | 11/2009 | Behal et al. | |
| 2009/0299999 A1 | 12/2009 | Loui et al. | |
| 2009/0322756 A1 | 12/2009 | Robertson et al. | |
| 2010/0077001 A1 | 3/2010 | Vogel et al. | |
| 2010/0138931 A1 | 6/2010 | Thorley et al. | |
| 2010/0223264 A1 | 9/2010 | Bruckner et al. | |
| 2010/0235311 A1 | 9/2010 | Cao et al. | |
| 2010/0274785 A1 | 10/2010 | Procopiuc et al. | |
| 2011/0071975 A1 | 3/2011 | Friedlander et al. | |
| 2011/0093471 A1 | 4/2011 | Brockway et al. | |
| 2011/0119243 A1 | 5/2011 | Diamond et al. | |
| 2011/0125764 A1 | 5/2011 | Carmel et al. | |
| 2011/0296397 A1 | 12/2011 | Vidal et al. | |
| 2012/0030220 A1 | 2/2012 | Edwards et al. | |
| 2012/0059839 A1 | 3/2012 | Andrade et al. | |
| 2012/0102121 A1 | 4/2012 | Wu et al. | |
| 2012/0117069 A1 | 5/2012 | Kawanishi et al. | |
| 2012/0131139 A1 | 5/2012 | Siripurapu et al. | |
| 2012/0246154 A1 | 9/2012 | Duan et al. | |
| 2012/0310934 A1 | 12/2012 | Peh et al. | |
| 2012/0323839 A1 * | 12/2012 | Kiciman et al. | 706/52 |
| 2013/0132405 A1 | 5/2013 | Bestgen et al. | |
| 2013/0166480 A1 | 6/2013 | Popescu et al. | |
| 2013/0166547 A1 | 6/2013 | Pasumarthi et al. | |
| 2013/0290232 A1 | 10/2013 | Tsytsarau et al. | |
| 2013/0303198 A1 | 11/2013 | Sadasivam et al. | |
| 2014/0013233 A1 | 1/2014 | Ahlberg et al. | |
| 2014/0022100 A1 | 1/2014 | Fallon et al. | |
| 2014/0156634 A1 | 6/2014 | Buchmann et al. | |
| 2014/0244550 A1 * | 8/2014 | Jin et al. | 706/12 |
| 2014/0351233 A1 | 11/2014 | Crupi et al. | |
| 2015/0074037 A1 | 3/2015 | Sarferaz | |

OTHER PUBLICATIONS

International Search Report and Written Opinion dated Mar. 6, 2015 corresponding to International Patent Application No. PCT/U52014/067993, 9 pages.

International Search Report and Written Opinion dated Mar. 10, 2015 corresponding to International Patent Application No. PCT/US2014/067999, 10 pages.

International Search Report and Written Opinion of the International Searching Authority dated Apr. 15, 2015 corresponding to International Patent Application No. PCT/US2014/068002, 10 pages.

International Search Report and Written Opinion dated Feb. 24, 2015 corresponding to International Patent Application No. PCT/US2014/067918, 10 pages.

* cited by examiner

EVENT DETECTION THROUGH TEXT ANALYSIS USING TRAINED EVENT TEMPLATE MODELS

CROSS-REFERENCE TO RELATED APPLICATIONS

This non-provisional patent application claims the benefit of U.S. Provisional Application Ser. No. 61/910,809, entitled "Event Detection Through Text Analysis Using Trained Event Template Models," filed Dec. 2, 2013, which is incorporated herein by reference in its entirety.

This application is related U.S. patent application Ser. No. 14/558,342, entitled "Event Detection Through Text Analysis Using Dynamic Self Evolving/Learning Module," filed Dec. 2, 2014, and U.S. patent application Ser. No. 14/558,254, entitled "Design And Implementation Of Clustered In-Memory Database," filed Dec. 2, 2014, each of which are hereby incorporated by reference in their entirety.

TECHNICAL FIELD

The present disclosure generally relates to information data mining from various media sources, and more specifically to event detection, extraction and validation from media sources.

BACKGROUND

The internet provides several sources of information which may be exploited. Internet news feeds and websites that allow users to interact with one another have exploded in popularity in the last few years. News feed channels such as CNN®, social networking websites sites such as Facebook® or LinkedIn®, and microblogging websites such as Twitter® enjoy widespread use. Millions of users post messages, images and videos on such websites on a daily, even hourly basis. Often, information gathered from these sources may refer to events taking place in real time. Such publicly accessible media may serve as a rich mine of information that may be used in different applications. For example, consider a scenario where a wide area emergency such as an earthquake or a flood has occurred and conventional emergency service lines are stressed beyond capacity; in this case users may turn to social media in order to request assistance. Another example of an event taking place in real time may be news feed reporting on civilians trapped under a building.

The high proliferation of information generated by media sources makes proper identification of events troublesome. Media data may contain ambiguous features which may hinder the ability of associating events with specific names, places or organizations. For example, a news feed may refer to a "Paris kidnapping"; however, in general, Paris may refer to a city in France, a city in Texas, or it may even refer to a person.

Thus a need exists for a method of detecting, extracting and validating events from media sources and effectively associate them with independent entities.

SUMMARY

A system and method for detecting events based on input data from a plurality of sources such as, social media, news feeds, and/or a corpus of documents. The system may receive input from a plurality of sources in the way of natural language unstructured text containing information about real time events. The system may use natural language processing techniques in order to separate individual entities and keywords. The process may then proceed with an entity disambiguation step and identify specific entities the source may be referring. The system may then identify independent events and associate them with the specific entities identified in the same source. The process may then validate events based on overlapping and co-occurrence of events and entities from other data sources. The system allows for the detection of events happening, and their proper association to disambiguated entities through text analysis of different sources.

In one embodiment, a system for detecting and extracting events comprises an event concept store storing one or more event models, wherein an event model corresponds to an event candidate and comprises a threshold event score and a set of one or more features having a corresponding weight; an entity and topic extraction processor configured to extract a set of entities and a set of topics from a data stream and then disambiguate each topic and each entity; an event extraction processor configured to identify each of the features of each event model that occur in the data stream, calculate an event score for one or more event candidates having an identified feature using the corresponding event model, and then extract the event candidate when an event score satisfies the threshold event score of the event model; and a spatial-temporal event processor configured to associate each topic and entity extracted from each of the data streams with each of the event candidates extracted from each of the data streams to form a spatial-temporal event grouping comprising one or more records, wherein a record is the event candidate and the associated topic or entity of a data stream.

In another embodiment, a computer-implemented method of event extraction and detection comprises normalizing, by a computer, one or more source items received over a network from a plurality of sources into one or more data streams adequate for computer-automated processing, wherein each data stream is drawn from a corresponding source item; extracting, by the computer, one or more entities from a data stream when entities are identified by the computer; extracting, by the computer, one or more topics from the data stream when topics are identified by the computer; disambiguating, by the computer, each of the entities and each of the topics; identifying, by the computer, one or more features in the data stream matching a feature in an event model, wherein an event model corresponds to an event candidate, and comprises a threshold event score and a set of one or more features having a corresponding weight; calculating, by the computer, an event score for each event model based on the weights assigned to the identified features; extracting, by the computer, each event candidate corresponding to an event model having an event score threshold satisfied by the event score; associating, by the computer, each event candidate with each topic or entity into a spatial-temporal grouping, wherein each event candidate and the associated topic or entity extracted from a source item are a record in the spatial-temporal grouping.

In one embodiment, a computer-implemented method comprises receiving, by a computer, a data stream comprising data representing text strings from a server of a data source; identifying, by the computer, in the data stream one or more features matching a model feature in an event model stored in non-transitory machine-readable storage of an event concept store, wherein at least one feature in the one or more features is an event candidate corresponding to the event model, and wherein at least one feature in the one or more features is an entity; assigning, by the computer, a weight to each respective entity according to the event model corresponding to the event candidate; calculating, by the computer, an event probability score based on one or more weights respectively assigned to the one or more entities; associating, by the computer, the event candidate with each respective entity into a first record of a spatial-temporal grouping, in response to the computing device determining that the event probability score satisfies an event likelihood threshold score of the event model; and storing, by the computer, the first record containing the event candidate, each respective entity associated with the event candidate, and the event probability score into a non-transitory machine-readable spatial-temporal grouping memory.

In another embodiments, a system for detecting and extracting events, the system comprising an event concept store comprising non-transitory machine-readable memory storing one or more event models, wherein an event model corresponds to an event candidate and comprises a threshold event score and a set of one or more features having a corresponding weight; an entity and topic extraction processor configured to extract a set of entities and a set of topics from a data stream and then disambiguate each topic and each entity; an event extraction processor configured to identify each of the features of each event model that occur in the data stream, calculate an event score for one or more event candidates having an identified feature using the corresponding event model, and then extract the event candidate when an event score satisfies the threshold event score of the event model; and a spatial-temporal event processor configured to associate each topic and entity extracted from each of the data streams with each of the event candidates extracted from each of the data streams to form a spatial-temporal event grouping comprising one or more records, wherein a record is the event candidate and the associated topic or entity of a data stream.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DEFINITIONS

Figure 1:
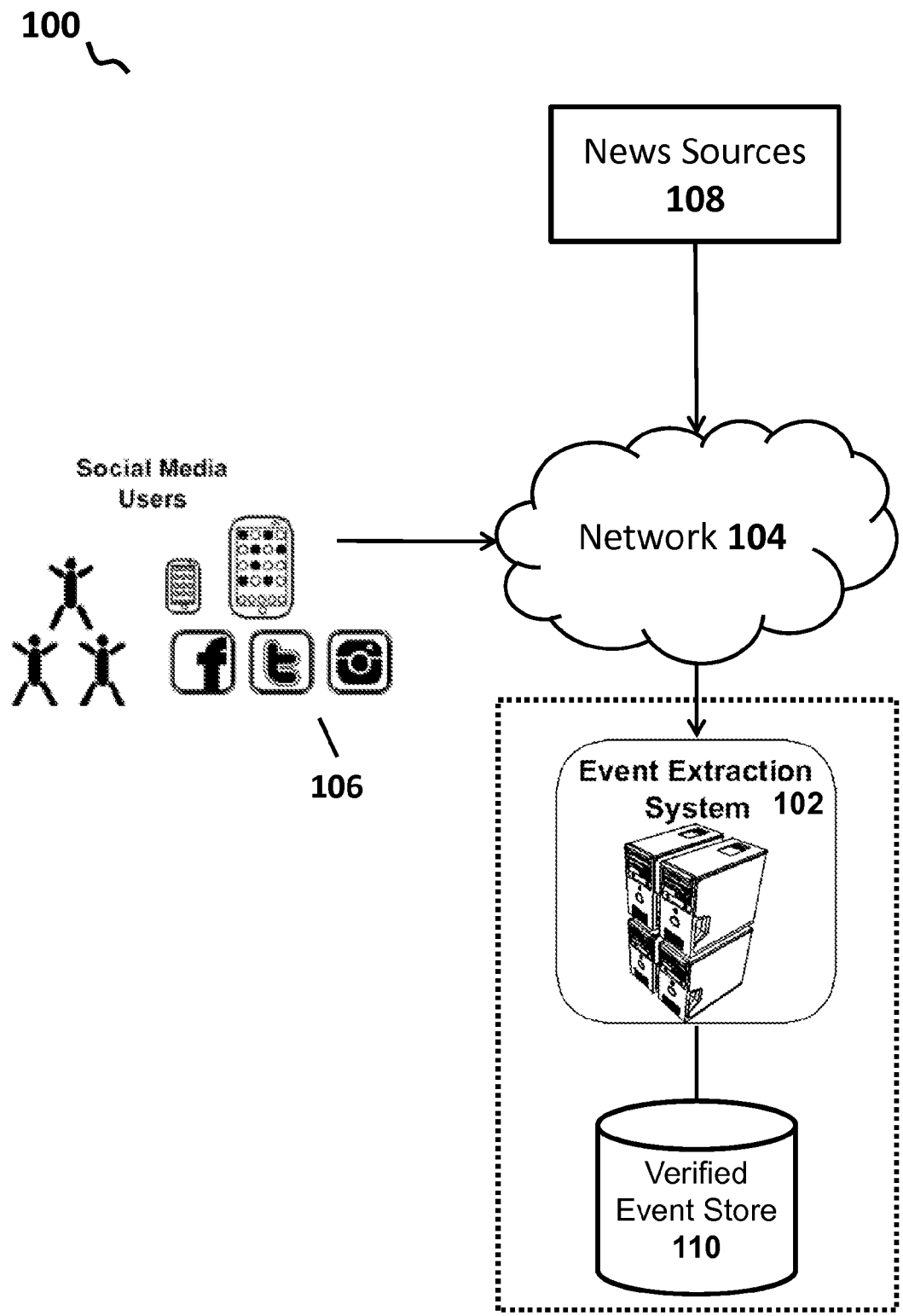
FIG. 1 shows components of an event extraction system, according to an embodiment.

As used herein, the following terms have the following definitions:

"Entity Extraction" refers to information processing methods for extracting information such as names, places, and organizations.

"Corpus" refers to a collection of one or more documents

"Features" is any information which is at least partially derived from a document.

"Event Concept Store" refers to a database of Event template models.

"Event" refers to one or more features characterized by at least the features' occurrence in real-time.

"Event Model" refers to a collection of data that may be used to compare against and identify a specific type of event.

"Module" refers to a computer or software components suitable for carrying out at least one or more tasks.

DETAILED DESCRIPTION

Reference will now be made in detail to the preferred embodiments, examples of which are illustrated in the accompanying drawings. The embodiments described above are intended to be exemplary. One skilled in the art recognizes that numerous alternative components and embodiments may be substituted for the particular examples described herein and still fall within the scope of the invention. Other embodiments may be used and/or other changes may be made without departing from the spirit or scope of the present disclosure. The illustrative embodiments described in the detailed description are not meant to be limiting of the subject matter presented here.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

The present disclosure describes a system and method for detecting, extracting and validating events from a plurality of sources. Sources may include news sources, social media websites and/or any sources that may include data pertaining to events.

Various embodiments of the systems and methods disclosed here collect data from different sources in order to identify independent events.

FIG. 1 shows components of a system 100 comprising external data sources 106, 108 communicatively coupled over a network 104 to an event extraction system 102. Event extraction system 102 may receive data from a plurality of data sources 106, 108 through a network 104. Non-limiting examples of data sources 106, 108 may include social media 106, subscription or news sources 108, though other data sources 106, 108 that store and/or publish information may be implemented such as, for example, a document corpus of historical events. Such data sources 106, 108 may store and/or publish machine-readable data representing unstructured texts such as, for example, Tweets® (i.e., text strings), a news article, or a Facebook® status message.

A network 104 may be a connection between the different sources and event extraction system 102 through the Internet or an intranet. The network 104 may comprise any suitable collection of hardware and software components (e.g., network interface cards, routers, switches, firewalls, antennas, towers, hubs, trunks) capable of supporting networked communications between computing devices through any suitable protocol (e.g., TCP/IP, 3G, 4G, Bluetooth).

Event extraction system 102 may include a plurality of components (not illustrated in FIG. 1) capturing and processing data received from a plurality of data sources 106, 108. Event extraction system 102 may comprise software with programmatic logic that may process inputs from the data sources 106, 108, and then identify and extract independent events and entities. Event extraction system 102 may be implemented in a single server computer or in a distributed architecture across a plurality of server computers.

Event extraction system 102 may store extracted events in event store 110. Event store 110 may be a database implemented in known in the art database management systems (DBMS) such as, for example, MySQL®, PostgreSQL, SQLite, Microsoft SQL Server®, Microsoft Access®, Oracle®, SAP®, dBASE, FoxPro®, IBM DB2®, LibreOffice Base®, FileMaker Pro®, and/or any other type of database that may organize collections of data. Event store 110 may also be a No-SQL database such as, for example, MongoDB®, Couchbase®, H-Base®, Cassandra®, Accumulo®, and/or any other type of database that may organize collections of data.

Data sources 106, 108 may be any form of computing service that stores, publishes, transmits, or otherwise makes available over a network 104 data representing information about events and entities. Data sources 106, 108 may comprise one or more computing devices, servers, and other computing hardware capable of storing data, such as a database, and publishing data over a network 104, such as a webserver. Non-limiting examples of data sources 106, 108 may include social media networks 106, online news sources 108, blogs, educational portals (e.g., Blackboard®, online university libraries), online journals and magazines, among others. Social media 106 may be any computing service hosting on one or more servers information exchanges between users. Social media 106 users may publish webpages containing text, hyperlinks, and/or other forms of media that is then viewable by other users. New sources 108 may be any computing service hosting on one or more servers a web-based new outlet that publishes webpages containing text, hyperlinks, and/or other forms of media. Data sources 106, 108 may publish data containing information that may be received and analyzed by an event extraction system 102 via webpages (e.g., HTML, PHP), RSS, e-mail, SMS, or other suitable protocol for publishing information across a computing network 104.

Figure 2:
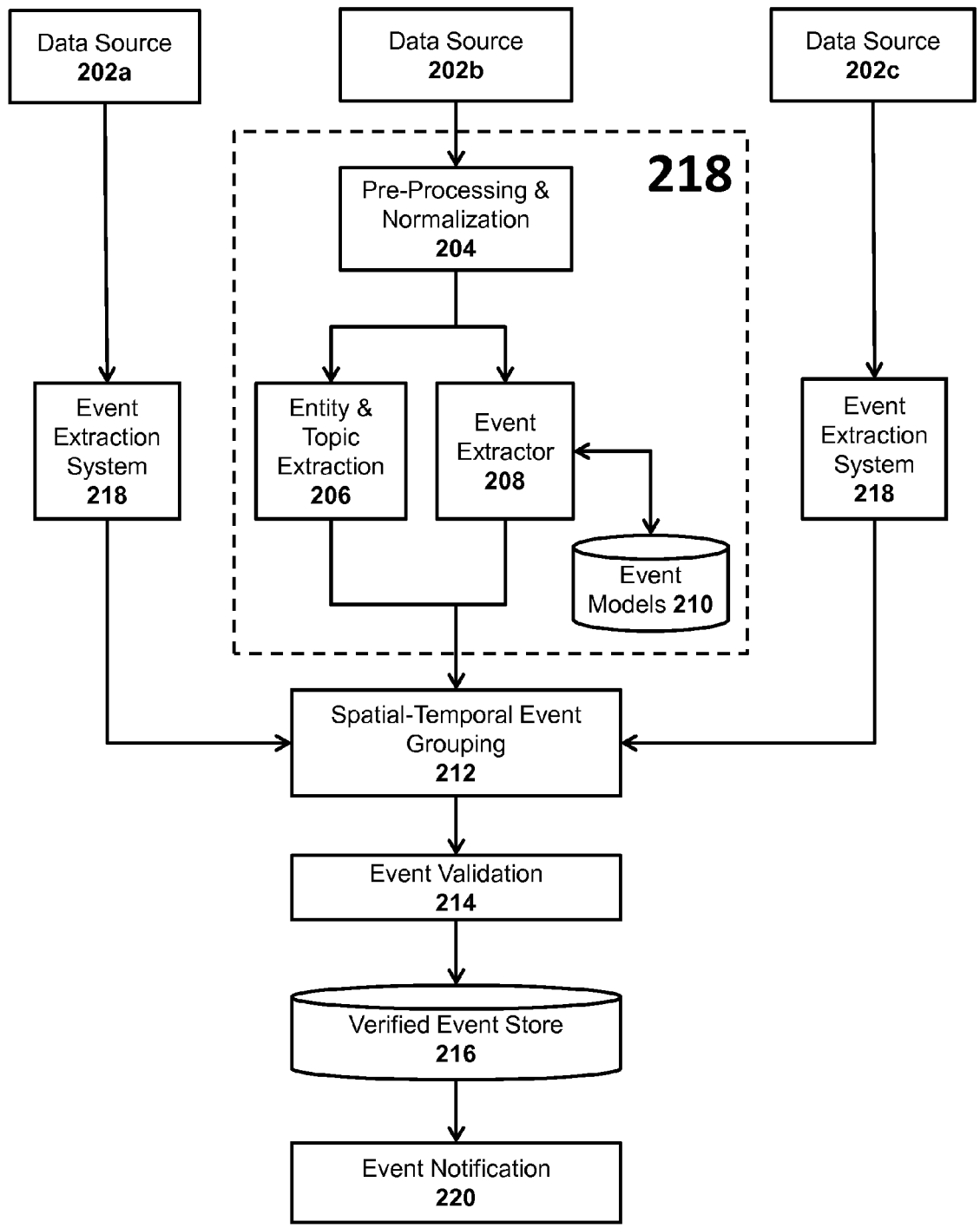
FIG. 2 is a flow diagram illustrating a process by which events and entities from different sources are extracted, validated and stored, according to an embodiment.

FIG. 2 is a flow diagram of an event extraction method 200 according to an embodiment. Event extraction method 200 may begin when data is received from one or more data sources 202. Data sources 202 may include social media computing services 202a, web-based news sources 202b, and/or any other data sources 202c that store and/or publish data containing information related to events.

In a first step 218, after event extraction system receives data from one or more data sources 202, event extraction system may perform event, topic and entity extraction, which may include the sub-steps 204 (pre-processing and data normalization), 206 (entity and topic extraction, and disambiguation), and 208 (event extraction).

In a first sub-step 204, pre-processing and data normalization may be performed by a software module implemented on a computer as part of an event extraction system performing event, topic and entity extraction 218. A module performing pre-processing and data normalization, first sub-step 204, may contain programmatic logic, which may involve the use of natural language processing techniques (NLP) for identifying key features in data received from a data source 202. Non-limiting examples of NLP techniques may include removing stop words, tokenization, stemming and part-of speech tagging among others know in the art.

In a next sub-step 206, after a pre-processing and data normalization sub-step 204, normalized pre-processed data may go through an entity/topic extraction and disambiguation, in which a software module of the event extraction system may identify and extract entities from the data and disambiguate independent entities from one another. Non-limiting examples of entities may include people, organizations, geographic locations, medical conditions, weapons, dates, time or any other entities. Entity and topic identification, extraction, and disambiguation of sub-step 206, may be performed by one or more software module implemented in a computer as part of event extraction system.

In a simultaneous, subsequent, or previous sub-step 208, an event extractor software module may identify possible event model candidates in the text received from the data source 202. Different types of events may include an accident (e.g., car accident, a train accident, etc.), a natural disaster (e.g., an earthquake, a flood, a weather event, etc.), a man-made disaster (e.g., a bridge collapse, a discharge of a hazardous material, an explosion, etc.), a security event (e.g., a terrorist attack, an act of war, etc.), a major sporting event or concert, election day coordination, traffic incident, and/or any other event. Latent Dirichlet Allocation (LDA), or other methods of detecting and extracting events may be used to extract events. The event extractor module performing sub-step 208 may be executed in conjunction with an event concept store 210. Event concept store 210 may be a database residing on any suitable computing device comprising non-transitory machine-readable storage media that stores event models. Event models may be compared against event model candidates identified in data. That is, in sub-step 208, the event extractor module may identify types of features, which in this example are keywords, in the normalized pre-processed data received from the data source 202, and compare the features against event models stored in the event concept store 210. The event extractor module may then compute a likelihood score representing the likelihood a set of features (e.g., keywords) pertains to a certain event model, based on comparing the features against each of the event models stored in the event concept store 210. In some implementations, a comparison between features of a event model candidate and a event model yielding a score between determined thresholds may indicate that the event model being compared is actually referenced in the data source.

In a next step 212, after event, topic, and entity extraction of step 218, the process may perform a spatial-temporal event grouping of extracted events and entities. That is, entities extracted from a data received from a data source 202b as a result of executing step 206 (entity extraction and disambiguation), and event model candidates identified in data step 202b during execution of step 208 (event extraction) may be associated together, as a spatial-temporal grouping, and then stored in non-transitory machine-readable storage memory. In cases having a plurality of data sources 202a-c, event model candidates identified in other data sources 202a, 202c and entities extracted from other data sources 202a, 202c may also be associated with one another, and then included to the spatial-temporal event grouping.

In a next step 214, after generating spatial-temporal event groupings based on entities and event model candidates extracted from data sources 202, software modules may perform event validation on the event model candidates in the spatial temporal event groupings. Event validation modules may compare spatial-temporal groupings (i.e., event model candidates and associated entities) extracted from different data sources 202a-c in order to determine whether a particular event model candidate extracted from a particular data source 202b resembles a real-time event being referenced in the different data sources 202a, 202c. Spatial-temporal groupings of different data sources 202a, 202c resembling a co-occurrence of event model candidates and entities of the particular data source 202b being validated may serve as validation that the event model candidate of the data source 202b resembles the event occurring in real-time.

Once validated in step 214, the event model candidate and the associated entities extracted from the data source 202b may be stored into a verified event store 216 database. For example, a server publishing text strings of a Twitter® feed may contain information describing a car accident in Washington D.C, while a news feed channel (e.g., text-based RSS) may contain text strings describing a car accident and high traffic jam in an area nearby the location referenced in the Twitter® feed. In this example of step 214, an event validation software module may calculate a probability score that both text-based streams of data are describing the same real-world event. When the probability score reaches an established threshold, the event may be considered verified and thus stored into the verified event store 216.

In some embodiments, a verified event store 216 may be used by different applications in order to query for different events depending on the purpose of the application. For example, an emergency service application may query for events related to vehicle accidents, fires and the like in order to provide first responders assistance. Another example may be a sports application which may query the database in order to determine the latest information in the NFL® Super Bowl®.

Event notification 220 may be used to push notifications or alerts to subscribers who wish to be notified immediately when events are verified. Once an event is verified, any subscribers who wish to receive notifications for that event type will be notified of the verified event.

Figure 3:
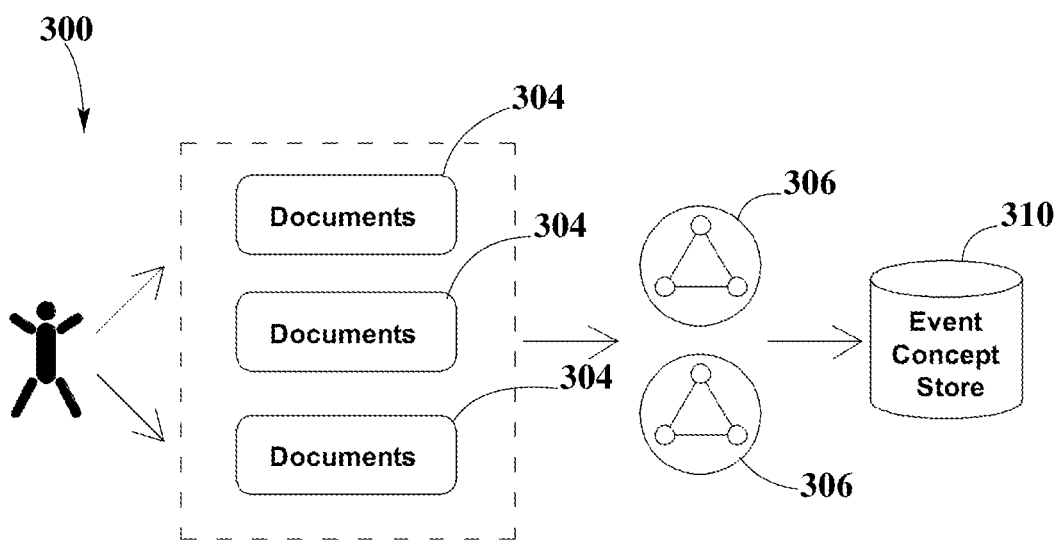
FIG. 3 shows a process of how an event concept store may be developed, according to an exemplary process embodiment.

FIG. 3 is an example embodiment of a training process 300 to build an event concept store 310. A plurality of documents 304 may be manually tagged by a person or an automated process in order to identify features pertaining to specific events and assign weights to those features. Features can be keywords, entities, topics or any other feature derived from the document. For example, an event model 306 for modeling the event, "Explosion"; a person can manually identify in a document 304 relating to an explosion the co-occurrence of keywords such as "Bomb" and/or "Fire". The user may then assign a weight to each word depending on the repetition or the co-occurrence of these keywords with others in a plurality of documents 304 related to explosions, and associate those with an event model 306 for "Explosion" stored in event concept store 310.

Figure 4:
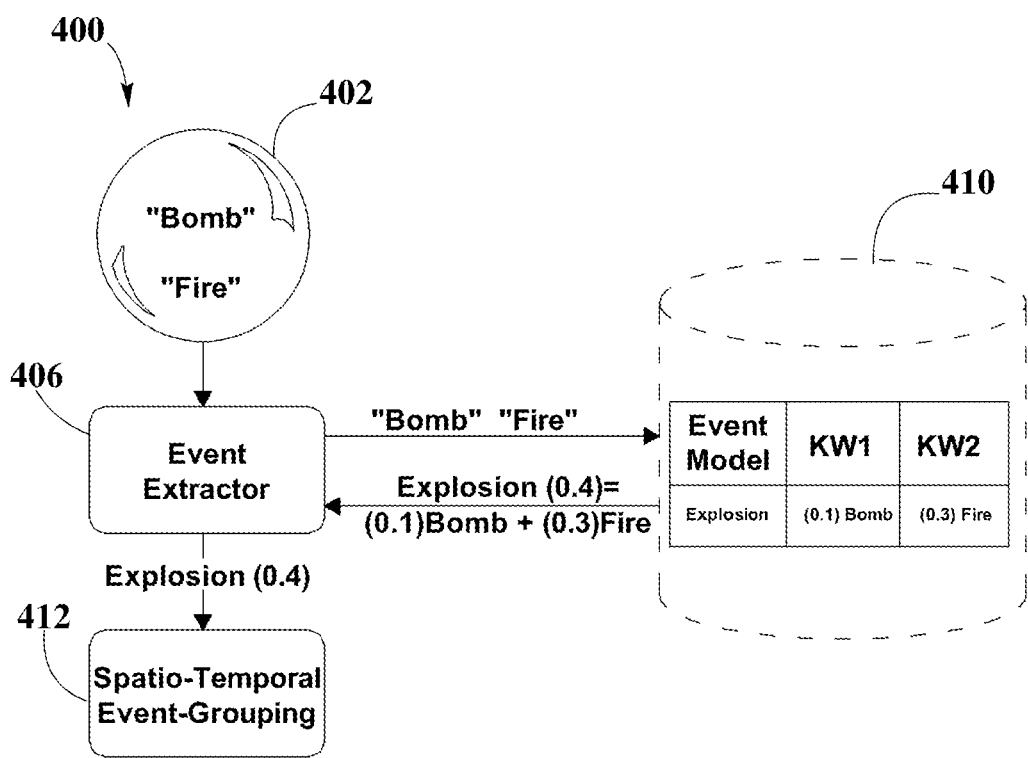
FIG. 4 is an of a detailed event extraction process using an event concept store, according to an embodiment.

FIG. 4 is an example embodiment of an event detection process 400. An event extractor 406 may identify features, which in this example are keywords 402, from a data input. In the illustrated example, the keywords "Bomb" and "Fire" are identified. The keywords may then be submitted for comparison against event models in the event concept store 410. In this example, event concept store 410 may assign weights of 0.1 to "Bomb" and 0.3 to "Fire" for the event model of "Explosion". Event extractor 406 may then add up the weighted scores and determine if the resulting score exceeds a determined threshold. In this example a 0.4 score is generated for the probability of the event being an "Explosion"; however other methods of calculating weighted scores may be used and are included within the scope of this disclosure. Event extractor 406 may then transfer an event possibility of 0.4 of explosion to spatial-temporal event grouping 412.

After pre-processing and normalization, entity extraction and disambiguation, and event extraction, each of the identified event model candidates and associated entities/topics from each of the different sources may be grouped together in a spatial-temporal event grouping 412, which may be stored as a record of the spatial-temporal grouping 412.

Figure 5:
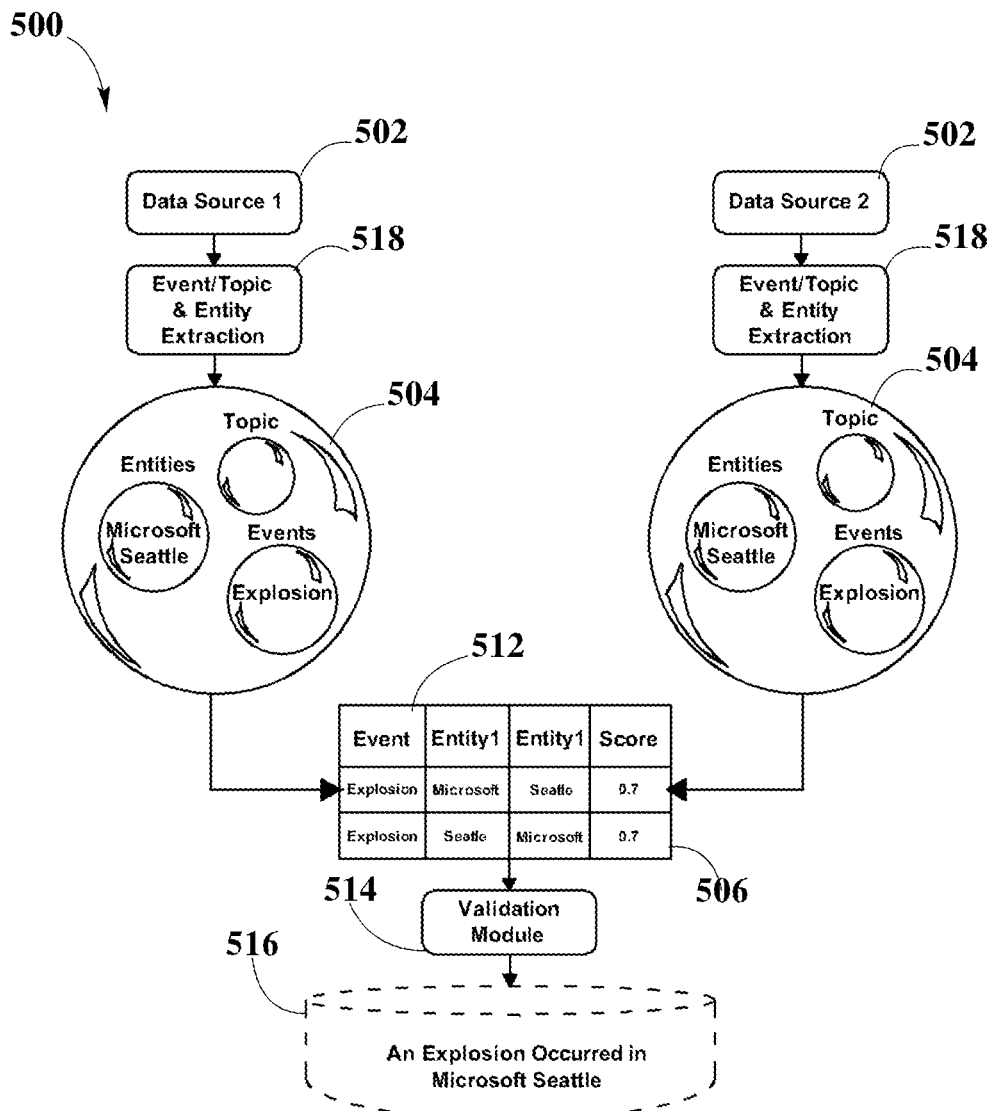
FIG. 5 is an of an event and entity extraction and validation using different data sources.

FIG. 5 is an example embodiment of an event grouping process 500. The process may begin by taking an input from different data sources 502. Each input from data sources 502 may go through an event, topic and entity extraction 518 process. Entities, topics and event model candidates 504 are extracted from the different data sources 502. Entities, topics and event model candidates 504 from different data sources 502 may then be grouped together in spatial-temporal grouping 512 and an initial confidence score 506 may be assigned to each entity, topic and event model candidate 504 association.

Validation module 514 may compare the different records stored in the spatial-temporal grouping, and identify an overlap between entities and event model candidates 504 from each of the different data sources 502. A score may be calculated using the initial confidence score 506 from the different entities and event model candidates 504 that overlap and/or repeat themselves in different data sources 502. A score greater than a predetermined threshold may serve as an indication that the event model candidate actually occurred. A verified event may then be stored in verified event store 516. In the exemplary embodiment illustrated in FIG. 5 an overlap of entities "Microsoft" and "Seattle" are extracted along with the event model candidate "Explosion" from different sources this may serve as an indication that an explosion has occurred at Microsoft®, in Seattle.

In Example #1 a tweet is extracted from Twitter and ingested into the event extraction system 102. The Tweet® contains the message "Bill Gates the chairman of Microsoft was Kidnapped in Syria". The process may go through pre-processing and data normalization 204 step where stop words are removed. The process may then continue and extract entities "Bill", "Gates", "chairman", "Microsoft", "Syria" in entity/topic extraction and disambiguation 206 step and extract the event "Kidnapped" using event extraction method 200. The entity extraction process may then identify Bill Gates as Chairman of Microsoft®, and associate the entity with the event kidnapped in spatial-temporal event grouping 212. Event validation 214 may then compare the kidnapping event of Bill Gates to other events from other sources also in spatial-temporal event grouping 212. Event validation 214 may identify if other events also refer to the kidnapping of the Chairman of Microsoft®, Bill Gates, in Syria, and thus validate if the event is real. If the event is real it may be transferred to verified event store 216

While various aspects and embodiments have been disclosed, other aspects and embodiments are contemplated. The various aspects and embodiments disclosed are for purposes of illustration and are not intended to be limiting, with the true scope and spirit being indicated by the following claims.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The embodiments described above are intended to be exemplary. One skilled in the art recognizes that numerous alternative components and embodiments that may be substituted for the particular examples described herein and still fall within the scope of the invention.

What is claimed is:

1. A computer-implemented method comprising:
   identifying, by the computer, in a data stream received from a data source among a plurality of data sources one or more features matching a model feature in an event model stored in non-transitory machine-readable storage of an event concept store, wherein at least one feature in the one or more features is an event candidate corresponding to the event model, and wherein at least one feature in the one or more features is an entity;
   assigning, by the computer, a weight to each respective entity according to the event model corresponding to the event candidate;
   calculating, by the computer, an event probability score based on one or more weights respectively assigned to the one or more entities;
   associating, by the computer, the event candidate with each respective entity into a first record of a spatial-temporal grouping, in response to the computing device determining that the event probability score satisfies an event likelihood threshold score of the event model;

storing, by the computer, the first record containing the event candidate, each respective entity associated with the event candidate, and the event probability score into a non-transitory machine-readable spatial-temporal grouping memory, wherein the spatial-temporal memory stores a plurality of records of spatial-temporal groupings, wherein each respective record is associated with each respective data source, whereby each respective record comprises the event candidate, a set of one or more entities identified in the associated data source, and the event probability score for each respective record;

calculating, by the computer, a validation score for the first record based on a comparison of each of the event probability scores in each respective record containing the event candidate; and storing, by the computer, the event candidate of the first record as a new verified event into non-transitory machine-readable storage memory of a verified event store, in response to determining the validation score for the first record satisfies a validation threshold.

2. The method according to claim 1, further comprising normalizing, by the computer, the data of the data stream into a format recognized by at least one computing device executing at least one software module.

3. The method according to claim 1, further comprising:
extracting, by the computing device executing an extraction module, each of the respective entities identified in the data stream; and
disambiguating, by the computer, each of the respective entities.

4. The method according to claim 1, wherein associating the event candidate with each respective entity into the first record of the spatial-temporal grouping further comprises:
generating, by the computer, the first record comprising the event candidate, each respective entity associated with the event candidate identified in the data stream, and the event probability score.

5. The method according to claim 1, further comprising receiving, by the computer, a plurality of data streams from a plurality of data sources, wherein the computer identifies one or more entities in each respective data stream according to one or more event models corresponding to one or more event candidates.

6. The method according to claim 1, further comprising:
automatically generating, by the computer, a notification indicating the new verified event was identified in the data source according to a set of notification criteria stored in non-transitory machine-readable storage memory.

7. The method according to claim 6, further comprising:
transmitting, by the computer, the notification to a remote electronic device upon generating the notification.

8. The method according to claim 1, further comprising:
receiving, by the computer, a tagged source item having one or more tags that identify one or more features of an event model having a corresponding weight;
generating, by the computer, a new event model based on the received tagged source item; and storing, by the computer, the new event model in the event concept store.

9. A system for detecting and extracting events comprising:
an event concept store comprising non-transitory machine-readable memory storing one or more event models, wherein an event model corresponds to an event candidate and comprises a threshold event score and a set of one or more features having a corresponding weight;
an entity and topic extraction processor configured to extract a set of entities and a set of topics from a data stream and then disambiguate each topic and each entity;
an event extraction processor configured to identify each of the features of each event model that occur in the data stream, calculate an event score for one or more event candidates having an identified feature using the corresponding event model, and then extract the event candidate when an event score satisfies the threshold event score of the event model;
a spatial-temporal event processor configured to associate each topic and entity extracted from each of the data streams with each of the event candidates extracted from each of the data streams to form a spatial-temporal event grouping comprising one or more records, wherein a record is the event candidate and the associated topic or entity of a data stream;
a verified event store storing one or more verified events; and
an event validation processor for verifying that each of the event candidates correspond to a real-world event and is configured to calculate a verification score for each event candidate in the spatial-temporal grouping based on a comparison of each of the records in the spatial-temporal grouping, and then store the event candidate as a verified event in the verified event store when the event candidate satisfies a verification threshold.

10. The system according to claim 9 wherein the verified event store further comprises a verified event query processor configured to receive a query from a remote computing device, process the query, and return a query result to the remote computing device.

11. The system according to claim 9, wherein the verified event store further comprises a verified event notification processor configured to transmit a verified event notification to a remote computing device based on one or more subscription rules.

12. The system according to claim 9, further comprising a training processor configured to build and update event models in the event concept store based on one or more new features identified in a tagged source item having a corresponding weight; and generate a new event model based on the tagged source item, and then store the new event model in the event concept store.

13. The system according to claim 12, wherein the training processor is configured to automatically determine whether a source item is tagged.

14. The system according to claim 9, further comprising a data normalizer configured to normalize one or more source items into the data stream adequate for computer-automated processing corresponding to each source item.

* * * * *